United States Patent
Le Van Suu

(10) Patent No.: US 7,013,187 B2
(45) Date of Patent: Mar. 14, 2006

(54) CONTROL PROCEDURE USING A FUZZY LOGIC MODEL OF AT LEAST ONE INVERSE TRANSFER FUNCTION OF A DYNAMIC SYSTEM

(75) Inventor: Maurice G. Le Van Suu, Savigny le Temple (FR)

(73) Assignee: STMicroelectronics, S.A., Montrouge (FR)

(*) Notice: Subject to any disclaimer, the term of this patent is extended or adjusted under 35 U.S.C. 154(b) by 179 days.

(21) Appl. No.: 10/683,567

(22) Filed: Oct. 10, 2003

(65) Prior Publication Data

US 2004/0122535 A1    Jun. 24, 2004

(30) Foreign Application Priority Data

Oct. 11, 2002   (FR) .................................. 02 12637

(51) Int. Cl.
*G05B 13/02*   (2006.01)
(52) U.S. Cl. ........................... 700/52; 700/28; 700/29; 700/50; 706/5; 706/7
(58) Field of Classification Search ................. 700/28, 700/29, 50, 51, 52; 706/1, 5, 7, 14, 900
See application file for complete search history.

(56) References Cited

U.S. PATENT DOCUMENTS

| 5,715,320 A | * | 2/1998 | Allie et al. ............... 381/71.12 |
| 6,064,920 A | * | 5/2000 | Monleone .................... 700/170 |

FOREIGN PATENT DOCUMENTS

EP         1 234 964       8/2002

OTHER PUBLICATIONS

French Preliminary Search Report dated Jun. 12, 2003 for French Application No. 0212637.

* cited by examiner

*Primary Examiner*—Albert W. Paladini
*Assistant Examiner*—Charles Kasenge
(74) *Attorney, Agent, or Firm*—Lisa K. Jorgenson; Stephen Bongini; Fleit, Kain, Gibbons, Gutman, Bongini & Bianco, P.L.

(57) ABSTRACT

A control procedure is provided for use during a regulation stage and according to a set point of a physical dynamic system, the set point being subject to, whilst operating, the influence of several physical quantities represented by input parameters, and adopting a behavior defined by at least a first physical output parameter, obliged to take a value represented by the set point, the first output parameter being linked to at least a first of the input parameters by a first transfer function of the system. According to the control procedure, a characterization stage is implemented in which at least a first inverse transfer function linking the first input parameter to the first output parameter is experimentally determined. A modeling stage is implemented in which the first inverse transfer function is translated through a fuzzy logic model in the form of a first set of ranges of the first output parameter, to each of which is attributed a specific value of the first input parameter. The regulation stage is implemented by determining a membership of the set point to one of the ranges of the first set, deducing from the membership and from the fuzzy logic model an estimated value of the first input parameter corresponding to the desired equality between the first output parameter and the set point, producing a measured value of the first input parameter, and regulating the first input parameter according to a difference between the estimated value and the measured value of the first input parameter. The present invention is particularly suited for use with electric motors.

20 Claims, 3 Drawing Sheets

CONTROL PROCEDURE USING A FUZZY LOGIC MODEL OF AT LEAST ONE INVERSE TRANSFER FUNCTION OF A DYNAMIC SYSTEM

CROSS-REFERENCE TO RELATED APPLICATIONS

This application is based upon and claims priority from French Patent Application No. 02-12637, filed Oct. 11, 2002, the entire disclosure of which is herein incorporated by reference.

BACKGROUND OF THE INVENTION

1. Field of the Invention

The present invention relates to control and regulation techniques, and more specifically to a control procedure for a dynamic system that uses a fuzzy logic model of at least one inverse transfer function of the system.

2. Description of Related Art

There is commonly used a control procedure, during a regulation stage and according to a set point, for a physical dynamic system belonging to a pre-set type, subject to, whilst operating, the influence of several physical quantities represented by input parameters, and which adopts a behavior defined by at least a first output physical parameter, obliged to take a value represented by the set point, with this first output parameter being at least linked to the first of the input parameters by a first transfer function of this system.

Numerous procedures that satisfy this definition are known and widely used in numerous fields of industry, notably to control electrical devices.

A classical control technique involves elaborating an error signal constituted by the difference between the set point and a measurement of the first output parameter, and in controlling the first input value in a way that will cancel the error signal.

This technique, however, proves to be difficult to apply when the first output parameter can only be measured by the implementation of complex and/or costly means.

Another well-known control technique involves characterizing the behavior adopted by the system in reply to different variations of the different input parameters, measuring one or several input parameters of the system, and predicting the state adopted by the latter through an adaptive filter, such as a Kalman filter.

This other technique can provide efficiency such that it can be applied to very complex systems. However, this other technique has a serious drawback of demanding major means of calculation.

SUMMARY OF THE INVENTION

In view of these drawbacks, it is an object of the present invention to overcome the above-mentioned drawbacks and to provide an improved control procedure.

One embodiment of the present invention provides a control procedure for use during a regulation stage and according to a set point of a physical dynamic system, the set point being subject to, whilst operating, the influence of several physical quantities represented by input parameters, and adopting a behavior defined by at least a first physical output parameter, obliged to take a value represented by the set point, the first output parameter being linked to at least a first of the input parameters by a first transfer function of the system. According to the control procedure, a characterization stage is implemented, prior to the regulation stage, in which at least a first inverse transfer function linking the first input parameter to the first output parameter is experimentally determined. A modeling stage is implemented, posterior to the characterization stage and prior to the regulation stage, in which the first inverse transfer function is translated through a fuzzy logic model in the form of a first set of ranges of the first output parameter, to each of which is attributed a specific value of the first input parameter. The regulation stage is implemented by determining a membership of the set point to one of the ranges of the first set, deducing from the membership and from the fuzzy logic model an estimated value of the first input parameter corresponding to the desired equality between the first output parameter and the set point, producing a measured value of the first input parameter, and regulating the first input parameter according to a difference between the estimated value and the measured value of the first input parameter.

Other objects, features and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
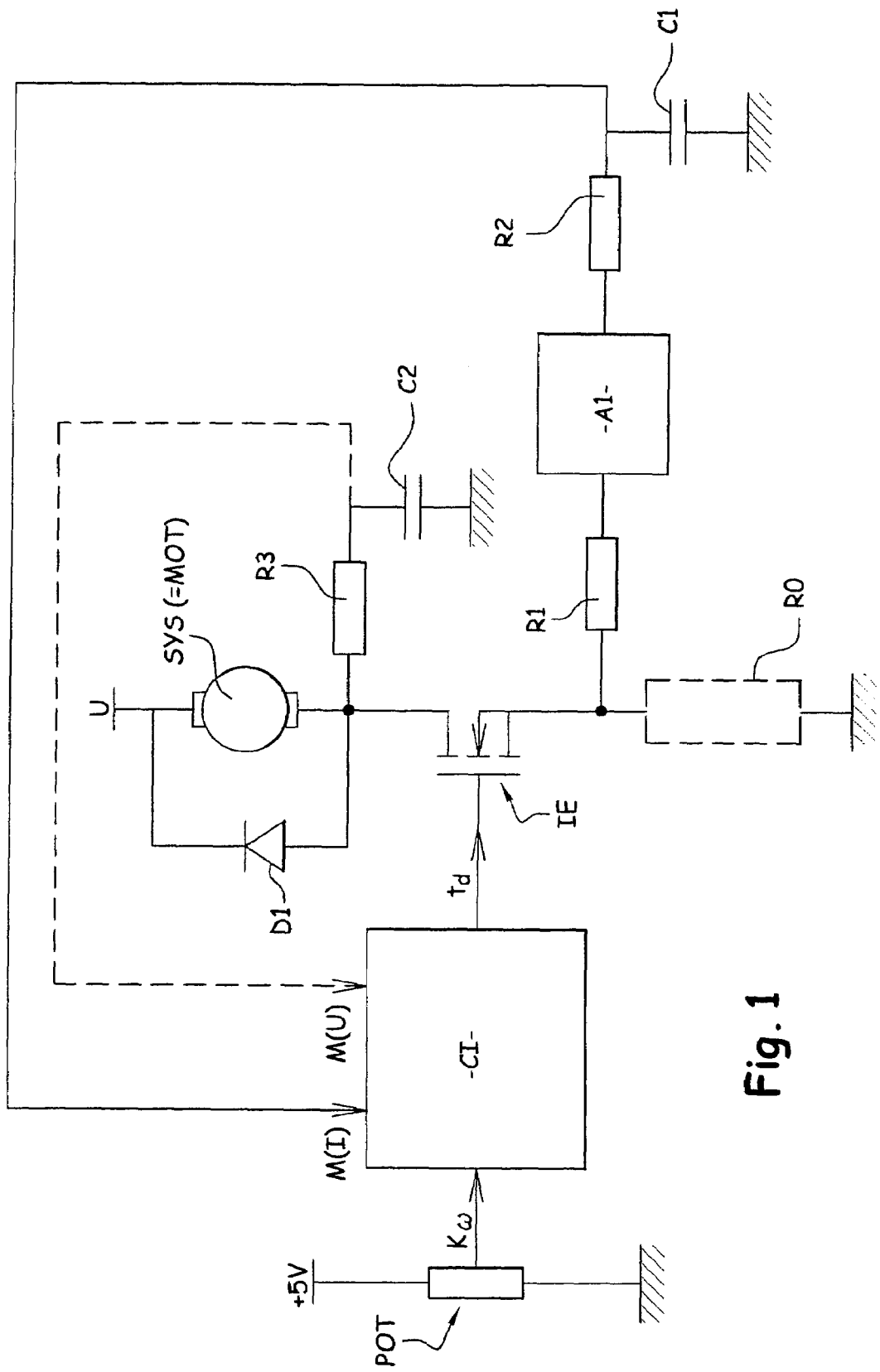
FIG. 1 is a diagram of an electrical system that implements a control procedure according to an embodiment of the present invention.

Preferred embodiments of the present invention will be described in detail hereinbelow with reference to the attached drawings.

Preferred embodiments of the present invention provide a control procedure that complies with the definition above and includes a characterization stage, prior to the regulation stage, in which at least a first inverse transfer function, linking the first input parameter to the first output parameter, is experimentally set, and a modeling stage, which is posterior to the characterization stage and prior to the regulation stage, in which the first inverse transfer function is translated through a fuzzy logic model in the form of a first set of ranges of the first output parameter, to each of which is attributed a specific value of the first input parameter. The regulation stage is implemented by determining a membership of the set point to one of the ranges of the first set, by deducing from this membership and from the fuzzy logic model an estimated value of the first input parameter corresponding to the desired equality between the first output parameter and the set point, by producing a measured value of the first input parameter, and by regulating the first input parameter according to a difference between the estimated value and the measured value of this first input parameter.

In some embodiments, the first output parameter is also linked to at least a second of the input parameters by a second transfer function of the system, and the procedure can also ensure that at least a second inverse transfer function, linking the second input parameter to the first output parameter, is experimentally determined during the characterization stage. At least the second inverse transfer function is translated, during the modeling stage, through the fuzzy logic model, in the form of a second set of ranges of the first output parameter, to each of which is attributed a specific value of the second input parameter The regulation stage is implemented by determining a membership of the set point to one of the ranges of the second set, by deducing from this membership and from the fuzzy logic model an estimated value of the second input parameter corresponding to the desired equality between the first output parameter and the set point, by producing a measured value of the second input parameter, and by regulating the first input parameter according to a difference between the estimated value and the measured value of the second input parameter.

These procedures can notably be used in embodiments where the physical system is a device using electric power energized by a supply voltage with a nominal or efficient value at least substantially constant, and where the first input parameter represents a supply current of this device.

In such an embodiment, the supply current of the electrical device is preferably regulated in terms of average value by cyclical modulation.

The second input parameter can then typically represent the supply voltage of the electrical device.

In embodiments where the physical system is an electric motor, the first output parameter is preferably constituted by the rotation speed of this motor.

The procedure can further include a safety procedure that includes a comparison of a supply current measurement with a pre-set threshold, and an interruption of the supply of the electrical device when the supply current measurement exceeds the threshold.

In some embodiments, the procedure of the present invention also includes an integration stage, intermediary between the modeling and the regulation stages, in which the first inverse transfer function, translated in the form of the first set of ranges, is memorized in an integrated circuit endowed with dedicated means of fuzzy logic calculation.

In one embodiment, the second inverse transfer function, translated in the form of the second set of ranges, is memorized in the same integrated circuit during this integration stage.

FIG. 1 is a diagram of an electrical system that implements a control procedure according to an embodiment of the present invention. In the exemplary embodiment illustrated, the present invention relates to a procedure to control a physical dynamic system SYS belonging to a pre-set type and constituted by a determined model of an electric motor MOT.

This procedure is designed to allow this system to be controlled, during a regulation stage which comes in time in the course of actual usage of this system, and according to a set point.

For example, the system that constitutes the motor MOT is controlled according to a set point $K\omega$ sent by a potentiometer POT, and representing, in the illustrated example, a desired rotation speed value of the motor.

The system SYS, in this instance constituted by this motor MOT, is subjected, whilst operating, to the influence of several physical quantities such as the resisting torque $Cp1$ that it must defeat, the current I that passes through it, and its supply voltage U, all of which may not be directly accessible, but are in all cases represented by a priori known or unknown input parameters, such as a current signal $S(I)$ and a voltage signal $S(U)$ respectively linked to the current I and to the supply voltage I and U.

Under the influence of these quantities, the system adopts a behavior that demonstrates itself by at least a first physical output parameter, in this instance by its rotation speed $\omega$, the procedure of the present invention having the purpose of obliging this output parameter to take a value $\omega k$ represented by the set point $K\omega$.

The system SYS being pre-set, its behavior can be studied prior to any actual usage.

For example, in the case where this system SYS is constituted by an motor MOT, energized by an instantaneous or constant and efficient source of voltage, it is known that an increase in the resisting torque $Cp1$ applied to the motor translates, when the rotation speed is constant, to an increase in demand by the motor in terms of electrical current.

It is thus known that the first output parameter constituted by the rotation speed $\omega$ of the motor MOT is at least linked to the supply current I, and therefore to the first input parameter $S(I)$ that reflects it, by a first transfer function G that characterizes this system and that can be established.

In the assembly illustrated in FIG. 1, the motor MOT is supplied by an alternating voltage U, rectified by a diode D1, during time periods defined by the on-state of an electronic switch IE, which is itself controlled by an integrated circuit CI. One of the motor MOT terminals is coupled to ground through a power resistor R0.

The voltage at the terminals of the power resistor R0 is filtered by a low-pass filter that includes in this exemplary embodiment two resistors R1 and R2, an amplifier A1, and a capacitor C1. The low pass filter sends to the integrated circuit C1 a measurement signal $M(I)$ representative of the average current having passed through the power resistor R0 and thus also representative of the average current having passed through the motor MOT.

In the case where the voltage U is insufficiently stable, the assembly illustrated in FIG. 1 can also include a second low-pass filter, which is made of a resistor R3 and a capacitor C2, for sending to the integrated circuit CI a measurement signal $M(U)$ representative of an average value of the supply voltage of the motor MOT.

The integrated circuit CI also receives the set point $K\omega$, which is sent by the potentiometer POT and which serves to set the rotation speed $\omega$ of the motor.

For each period T of the voltage U, the integrated circuit CI places the electronic switch IE in its cut-off position during a time period $t_d$, and in its on-state during a time period $T-t_d$. The supply current I of the motor MOT is thus regulated in terms of average value by cyclical modulation.

The problem that the present invention resolves, and that FIG. 1 renders visible, is controlling the system SYS, in this instance the motor MOT, according to the set point $K\omega$ that its first output parameter must respect, while possibly having only the measured value $M(I)$ of the first input parameter $S(I)$.

To carry this out, the control procedure of this embodiment of the present invention includes a characterization stage of the system SYS, followed by a modeling stage, with these two stages taking place prior to any usage of this system and being therefore prior to the regulation stage.

In the characterization stage, there is experimentally determined, according to a well-known method, at least a first inverse transfer function $G^{-1}$ which links the first input parameter $S(I)$ to the first output parameter $\omega$.

In the modeling stage, this first inverse transfer function $G^{-1}$ is translated through a fuzzy logic model in the form of a first set of ranges X0 to X9 of the first output parameter ω, to each of which is attributed a specific value Y0 to Y9 of the first input parameter S(I).

Figure 2:
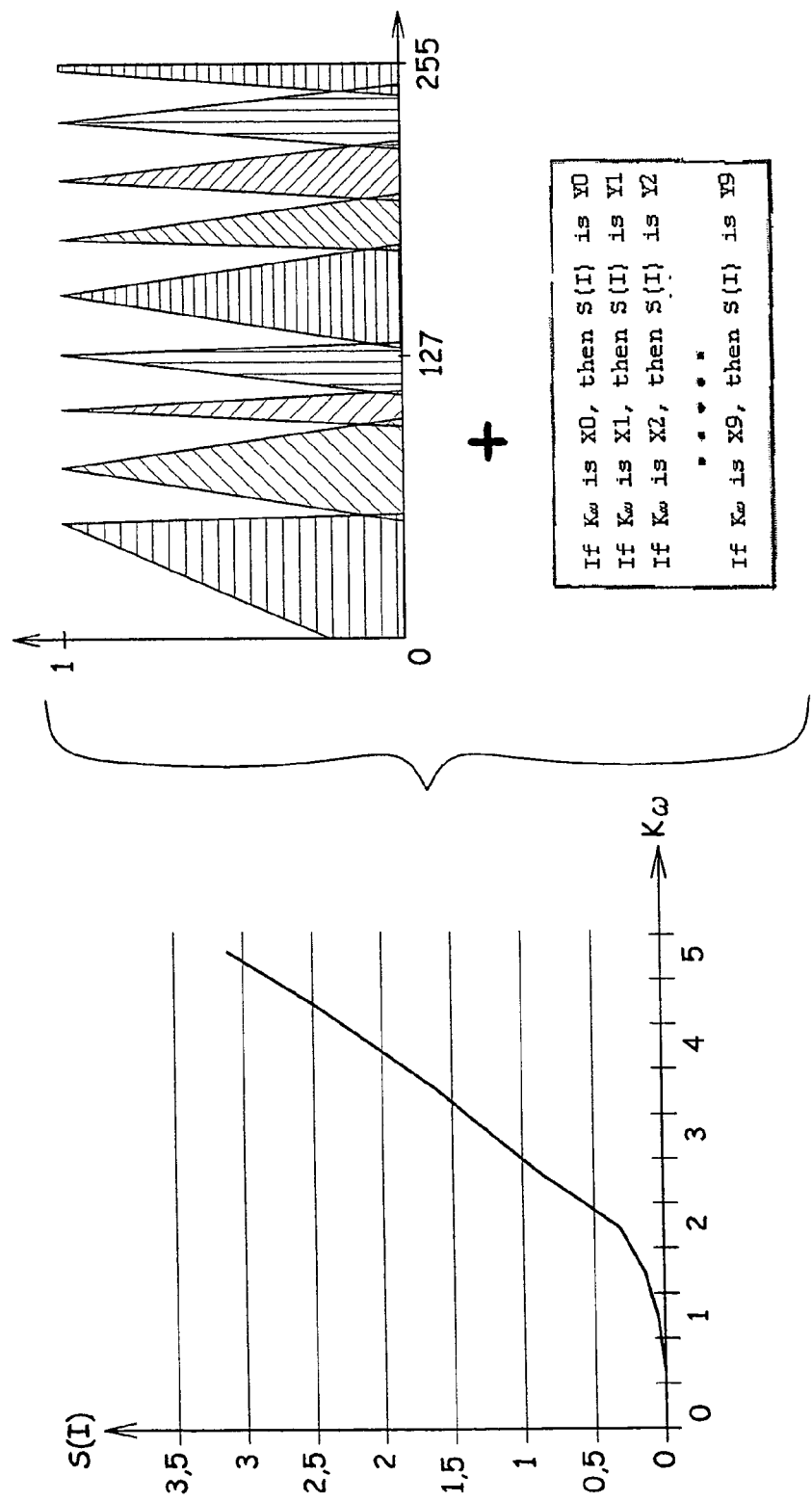
FIG. 2 is a diagram representing the transformation of an inverse transfer function of a system to be controlled according to a set point, into a set of functions or membership ranges of the set point.

This translation, symbolically represented in FIG. 2, can notably be carried out via a software product known as "AFM", which STMicroelectronics Ltd has made freely available to the public on its Internet site.

Once the characterization and modeling stages have been performed, the procedure preferably includes an integration stage, in which the first inverse transfer function $G^{-1}$, which was translated in the form of a first set of ranges X0 to X9, is memorized in the integrated circuit CI.

To carry this out, the circuit CI is advantageously endowed with dedicated means of fuzzy logic calculation, and is for example constituted by the reference circuit ST 52 E 440 G3, commercial available from STMicroelectronics Ltd.

All of the preparatory stages having been performed, the regulation stage, which constitutes the operational stage of the procedure for its actual application, can be implemented.

During this regulation stage, the circuit CI determines which range X0 to X9 of the first set that the set point Kω that it receives is a member.

By applying the rules of the memorized model, of which the lower right part of FIG. 2 shows an example, the circuit CI deduces from the value of the set point Kω that it receives, an estimated value S(I)e that the first input parameter S(I) must take a priori to ensure the desired equality between the first output parameter ω and the set point Kω.

Finally, the first input parameter S(I) is regulated according to the difference ΔI between the estimated value S(I)e and the measured value M(I) of this first input parameter S(I). This regulation physically takes the form of a modulation of the time period $t_d$ in the illustrated example.

In the description above, the first output parameter constituted by the rotation speed has been exclusively considered to be linked, via the first transfer function G, to the first input parameter S(I).

However, it could be that the first output parameter ω is also linked to at least a second input parameter S(U) by a second transfer function H of the system.

This is the case in the illustrated example, where the rotation speed of the motor ω also depends on the input parameter S(U) which reflects the supply voltage of the motor MOT.

As long as the supply current U retains a stable and known value, the regulation as previously described is entirely sufficient.

However, in the case where the supply voltage U is unstable, and where consequently the second input parameter S(U) is subject to variations that affect the quality of the regulation, the characterization stage preferably includes the experimental determination of at least a second inverse transfer function $H^{-1}$, that links this second input parameter S(U) to the first output parameter ω.

During the modeling stage, this second inverse transfer function $H^{-1}$ is translated, as the first inverse transfer function $G^{-1}$, through a fuzzy logic model, in the form of a second set of ranges of the first output parameter ω, to each of which is attributed a specific value of the second input parameter S(U).

Once translated, this second inverse transfer function $H^{-1}$ is advantageously memorized in the same integrated circuit CI as the first inverse transfer function $G^{-1}$.

Figure 3:
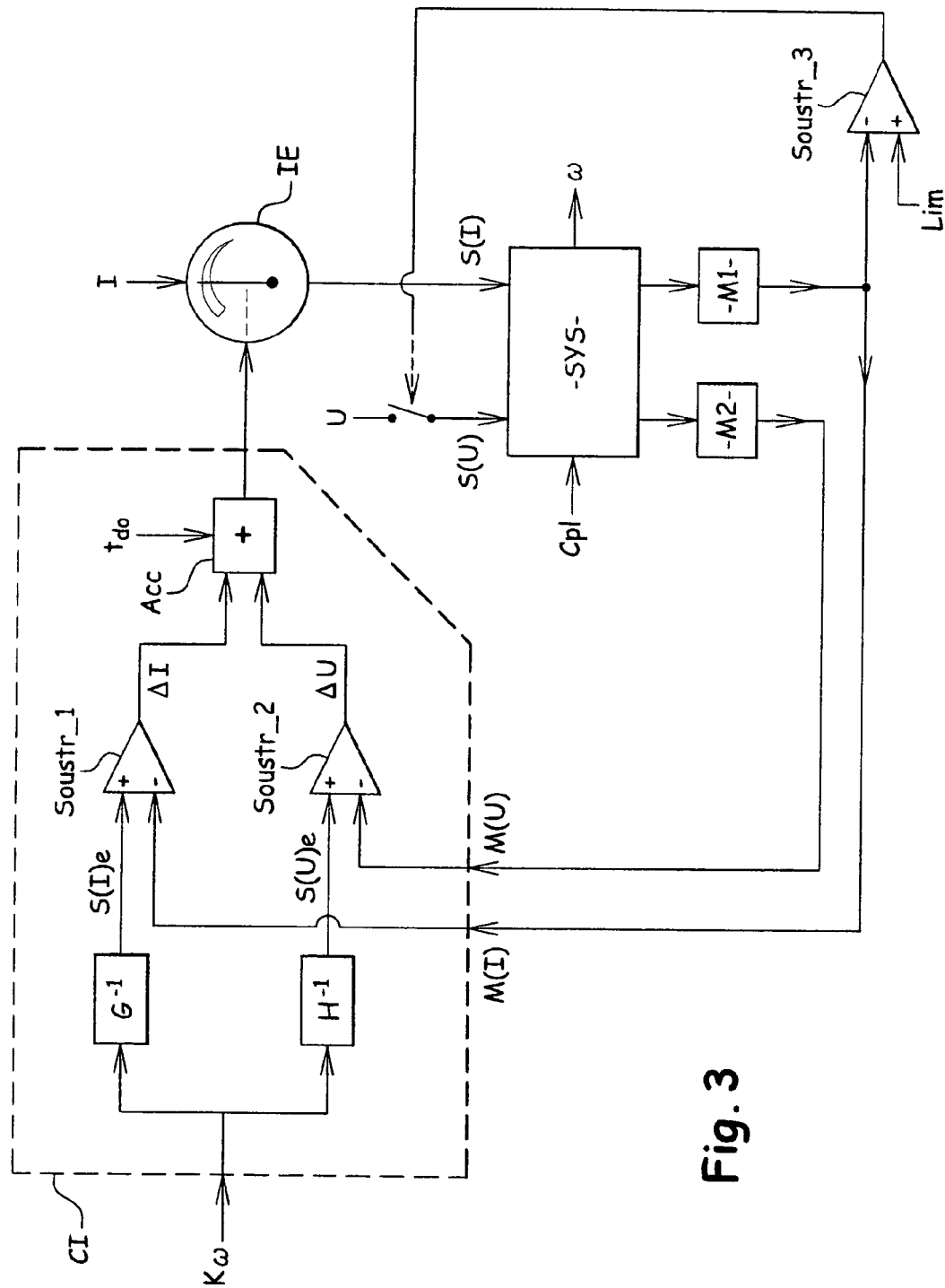
FIG. 3 is an operational and symbolic diagram of an implementation of a control procedure according to an embodiment of the present invention.

The unreeling of the regulation stage, which globally implements the two inverse transfer functions $G^{-1}$ and $H^{-1}$, is illustrated in a symbolic manner in FIG. 3.

In this figure, M1 and M2 designate the measurement means of the circuit that respectively allow the measured values M(I) and M(U) of the first and second input parameters S(I) and S(U) to be obtained. Soustr_1, Soustr_2 and Soustr_3 designate various functional modules, each of which is used to establish the difference between two signals or quantities.

The difference ΔI between the estimated value S(I)e and the measured value M(I) of the first input parameter S(I), obtained as previously described by the module Soustr_1, comes to modify either positively or negatively the content of an algebraic accumulator Acc.

This accumulator, initially loaded with a value $t_{d0}$ chosen in a haphazard or optimized manner, and applied at the starting up of the system constituted by the motor MOT, periodically sends a signal defining the time period $t_d$ during which the motor is not energized.

Just as the integrated circuit CI identifies which range of the first set that the set point Kω that it receives is a member of and deduces from this an estimated value S(I)e that the first input parameter S(I) must take a priori, this circuit identifies which range of the second set that the set point Kω that it receives is a member of, and deduces from this an estimated value S(U)e that the second input parameter S(U) must take a priori.

The difference ΔU between the estimated value S(U)e and the measured value M(U) of the second input parameter S(U), issued by the module Soustr_2, comes to modify either positively or negatively the content of the algebraic accumulator Acc, and therefore contributes to the definition of the time period $t_d$ during which the motor MOT is not energized.

As shown in FIG. 3, the procedure of the present invention can include a procedure aimed at protecting the system constituted by the motor MOT against over-current.

To carry this out, the supply current measurement M(I) is constantly compared to a pre-set threshold Lim in a module Soustr_3, and the energizing of the motor is interrupted if this measurement M(I) exceeds the pre-set threshold Lim.

The present invention can be implemented in hardware, software, or a combination of hardware and software. Any processor, controller, or other apparatus adapted for carrying out the functionality described herein is suitable. A typical combination of hardware and software could include a general purpose microprocessor (or controller) with a computer program that, when loaded and executed, carries out the functionality described herein.

The present invention can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A control method for use during a regulation stage and according to a set point of a physical dynamic system, the set point being subject to, whilst operating, the influence of several physical quantities represented by input parameters, and adopting a behavior defined by at least a first physical output parameter, obliged to take a value represented by the set point, the first output parameter being linked to at least a first of the input parameters by a first transfer function of the system, said control method comprising:

implementing a characterization stage, prior to the regulation stage, in which at least a first inverse transfer function linking the first input parameter to the first output parameter is experimentally determined; and implementing a modeling stage, posterior to the characterization stage and prior to the regulation stage, in which the first inverse transfer function is translated through a fuzzy logic model in the form of a first set of ranges of the first output parameter, to each of which is attributed a specific value of the first input parameter; and implementing the regulation stage by determining a membership of the set point to one of the ranges of the first set, deducing from the membership and from the fuzzy logic model an estimated value of the first input parameter corresponding to the desired equality between the first output parameter and the set point, producing a measured value of the first input parameter, and regulating the first input parameter according to a difference between the estimated value of the first input parameter and the measured value of the first input parameter but not according to a difference between the set point and a measured value of the first output parameter.

2. The control method according to claim 1, further comprising implementing an integration stage, intermediary between the modeling stage and the regulation stage, in which the first inverse transfer function, translated in the form of the first set of ranges, is memorized in an integrated circuit that includes means for fuzzy logic calculation.

3. The control method according to claim 1, wherein the physical system is an electrical device that is supplied by a supply voltage with a nominal or efficient value at least substantially constant.

4. The control method according to claim 1, wherein the first input parameter represents a supply current of the system.

5. The control method according to claim 1, wherein the physical system is an electrical device, and the first input parameter represents an electrical quantity of the device.

6. The control method according to claim 1, wherein the step of implementing the regulation stage does not include determining a difference between the set point and a measured value of the first output parameter.

7. A control method for use during a regulation stage and according to a set point of a physical dynamic system, the set point being subject to, whilst operating, the influence of several physical quantities represented by input parameters, and adopting a behavior defined by at least a first physical output parameter, obliged to take a value represented by the set point, the first output parameter being linked to at least a first of the input parameters by a first transfer function of the system, said control method comprising:

implementing a characterization stage, prior to the regulation stage, in which at least a first inverse transfer function linking the first input parameter to the first output parameter is experimentally determined; and implementing a modeling stage, posterior to the characterization stage and prior to the regulation stage, in which the first inverse transfer function is translated through a fuzzy logic model in the form of a first set of ranges of the first output parameter, to each of which is attributed a specific value of the first input parameter; and implementing the regulation stage by determining a membership of the set point to one of the ranges of the first set, deducing from the membership and from the fuzzy logic model an estimated value of the first input parameter corresponding to the desired equality between the first output parameter and the set point, producing a measured value of the first input parameter, and regulating the first input parameter according to a difference between the estimated value and the measured value of the first input parameter, wherein the physical system is an electrical device that is supplied by a supply voltage with a nominal or efficient value at least substantially constant, and the first input parameter represents a supply current of the device.

8. The control method according to claim 7, wherein the supply current of the device is regulated in terms of average value by cyclical modulation.

9. The control method according to claim 7, wherein the physical system is an electric motor.

10. The control method according to claim 9, wherein the first output parameter is the rotation speed of the motor.

11. The control method according to claim 7, further comprising implementing a safety procedure that includes comparing a supply current measurement with a pre-set threshold, and interrupting the supply of the electrical device when the supply current measurement exceeds the threshold.

12. A control method for use during a regulation stage and according to a set point of a physical dynamic system, the set point being subject to, whilst operating, the influence of several physical quantities represented by input parameters, and adopting a behavior defined by at least a first physical output parameter, obliged to take a value represented by the set point, the first output parameter being linked to at least a first of the input parameters by a first transfer function of the system and a second of the input parameters by a second transfer function of the system, said control method comprising:

implementing a characterization stage, prior to the regulation stage, in which at least a first inverse transfer function linking the first input parameter to the first output parameter is experimentally determined, and at least a second inverse transfer function linking the second input parameter to the first output parameter is experimentally determined; and implementing a modeling stage, posterior to the characterization stage and prior to the regulation stage, in which the first inverse transfer function is translated through a fuzzy logic model in the form of a first set of ranges of the first output parameter to each of which is attributed a specific value of the first input parameter, and the second inverse transfer function is translated through the fuzzy logic model in the form of a second set of ranges of the first output parameter to each of which is attributed a specific value of the second input parameter; and implementing the regulation stage by determining a membership of the set point to one of the ranges of the first set and a membership of the set point to one of the ranges of the second set, deducing from the membership and from the fuzzy logic model an estimated value of the first input parameter corresponding to the desired equality between the first output parameter and the set point and an estimated value of the second input parameter corresponding to the desired equality between the first output parameter and the set point, producing a measured value of the first input parameter and a measured value of the second input parameter, and regulating the first input parameter according to a difference between the estimated value of the first input parameter and the measured value of the first input parameter and according to a difference between the estimated value of the second input parameter and the measured value of the second input parameter but not according to a difference between the set point and a measured value of the first output parameter.

13. The control method according to claim 12, further comprising:

implementing an integration stage, intermediary between the modeling stage and the regulation stage, in which the first inverse transfer function, translated in the form of the first set of ranges, is memorized in an integrated circuit that includes means for fuzzy logic calculation, wherein, during the integration stage, the second inverse transfer function, translated in the form of the second set of ranges, is memorized in the same integrated circuit.

14. The control method according to claim 12, further comprising implementing an integration stage, intermediary between the modeling stage and the regulation stage, in which the first inverse transfer function, translated in the form of the first set of ranges, is memorized in an integrated circuit that includes means for fuzzy logic calculation.

15. A control method for use during a regulation stage and according to a set point of a physical dynamic system, the set point being subject to, whilst operating, the influence of several physical quantities represented by input parameters, and adopting a behavior defined by at least a first physical output parameter, obliged to take a value represented by the set point, the first output parameter being linked to at least a first of the input parameters by a first transfer function of the system and a second of the input parameters by a second transfer function of the system, said control method comprising:

implementing a characterization stage, prior to the regulation stage, in which at least a first inverse transfer function linking the first input parameter to the first output parameter is experimentally determined, and at least a second inverse transfer function linking the second input parameter to the first output parameter is experimentally determined; and implementing a modeling stage, posterior to the characterization stage and prior to the regulation stage, in which the first inverse transfer function is translated through a fuzzy logic model in the form of a first set of ranges of the first output parameter to each of which is attributed a specific value of the first input parameter, and the second inverse transfer function is translated through the fuzzy logic model in the form of a second set of ranges of the first output parameter to each of which is attributed a specific value of the second input parameter; and implementing the regulation stage by determining a membership of the set point to one of the ranges of the first set and a membership of the set point to one of the ranges of the second set, deducing from the membership and from the fuzzy logic model an estimated value of the first input parameter corresponding to the desired equality between the first output parameter and the set point and an estimated value of the second input parameter corresponding to the desired equality between the first output parameter and the set point, producing a measured value of the first input parameter and a measured value of the second input parameter, and regulating the first input parameter according to a difference between the estimated value and the measured value of the first input parameter and according to a difference between the estimated value and the measured value of the second input parameter.

wherein the physical system is an electrical device that is supplied by a supply voltage with a nominal or efficient value at least substantially constant, and the first input parameter represents a supply current of the device.

16. The control method according to claim 15, wherein the supply current of the device is regulated in terms of average value by cyclical modulation.

17. The control method according to claim 15, wherein the physical system is an electric motor.

18. The control method according to claim 17, wherein the first output parameter is the rotation speed of the motor.

19. The control method according to claim 15, further comprising implementing a safety procedure that includes comparing a supply current measurement with a pre-set threshold, and interrupting the supply of the electrical device when the supply current measurement exceeds the threshold.

20. The control method according to claim 15, wherein the second input parameter represents the supply voltage of the device.

* * * * *